July 31, 1928.　　　R. G. WESTBROOK　　　1,679,190

WASTE TRAP

Filed Sept. 16, 1926　　　2 Sheets-Sheet 1

Inventor
R.G. WESTBROOK.

Attorney

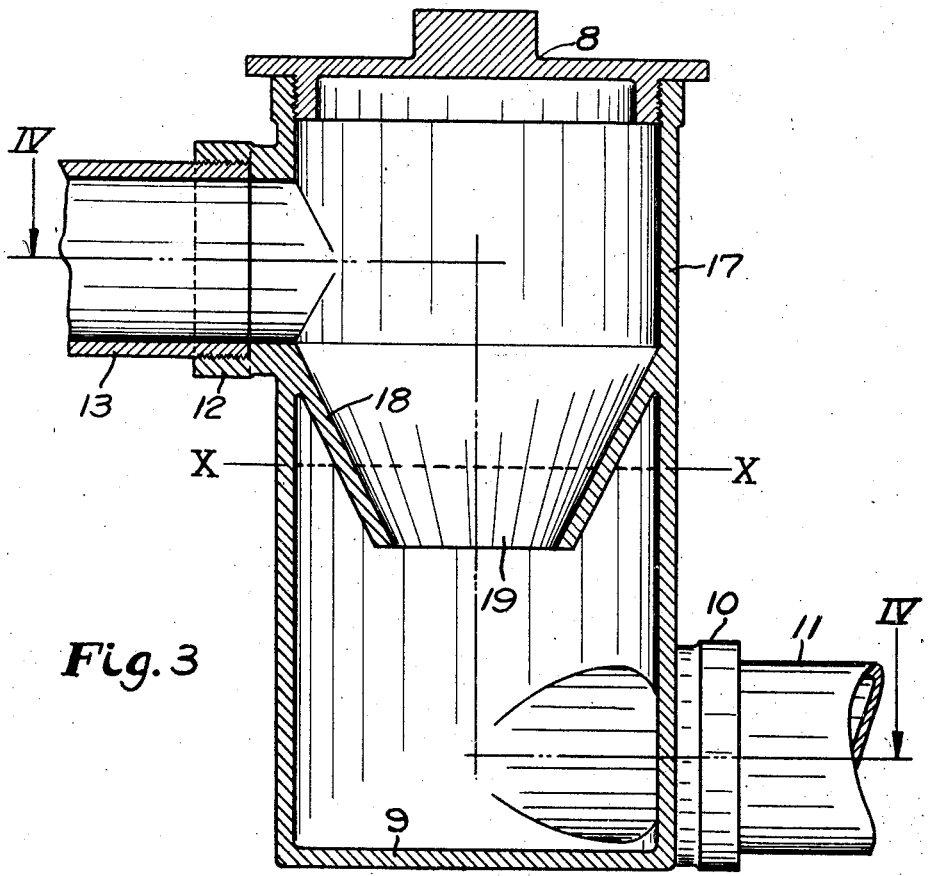
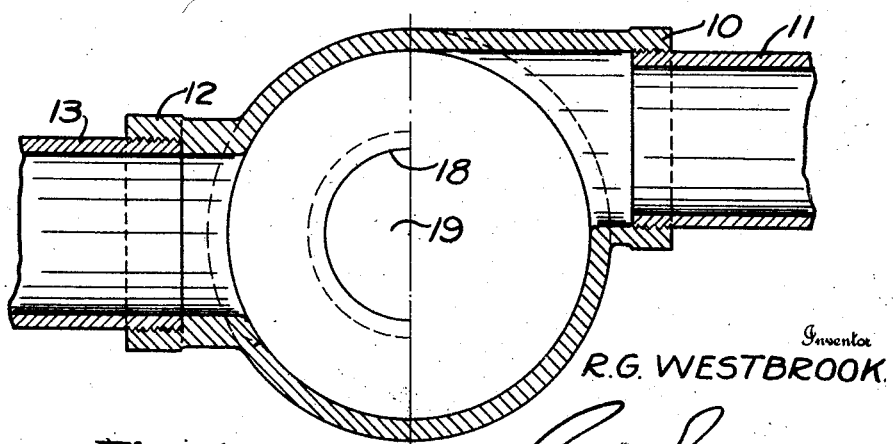

Patented July 31, 1928.

1,679,190

UNITED STATES PATENT OFFICE.

ROBERT G. WESTBROOK, OF BIRMINGHAM, ALABAMA.

WASTE TRAP.

Application filed September 16, 1926. Serial No. 135,965.

This invention relates to waste traps of the automatic fluid-seal type, such as are adapted for use with wash-basins, sinks, bath-tubs, cesspools, and the like, and particularly to such traps in which the flushing action is secured without siphoning.

A primary object of my present invention is to provide a waste trap adapted for more efficient and effective flushing action than has been obtainable with any of the waste traps known heretofore, without siphoning, and without the use of a valve, float, or other such moving part.

A further object is to secure in such a trap maximum effectiveness as regards automatic gas sealing, and prevention of unintentional drainage of the bowl or other container to which the trap is applied.

Another object is to produce a swirling movement of the flush water in the trap, whereby the accumulation of grease, oil, or other waste matter on any portion of the interior of the trap is prevented, and all waste matter, whether fluid or solid, and whether lighter or heavier than water, is caused to be discharged from the trap with the flush water.

And still further objects are to simplify the construction and minimize the cost of the trap; to provide for maximum durability thereof, by the elimination of parts that are unduly frangible, or are easily affected by abrasive wear; to facilitate the connecton of the inlet and the outlet of the trap with pipes or other plumbing apparatus, irrespective of their location relative to that of the trap; and to avoid the necessity of using gaskets, or the like, in connection with any part of the trap.

The means by which the foregoing and other objects are accomplished by my invention, and the manner of their accomplishment, readily will be understood from the following description, on reference to the accompanying drawings, in which:—

Fig. 3 is a vertical sectional view of a modified form of my improved waste trap, taken on a line through the center of the body and that of the outlet opening.

Fig. 4 is a sectional plan, the section being taken substantially on line 4—4 of Fig. 3.

Figure 1:
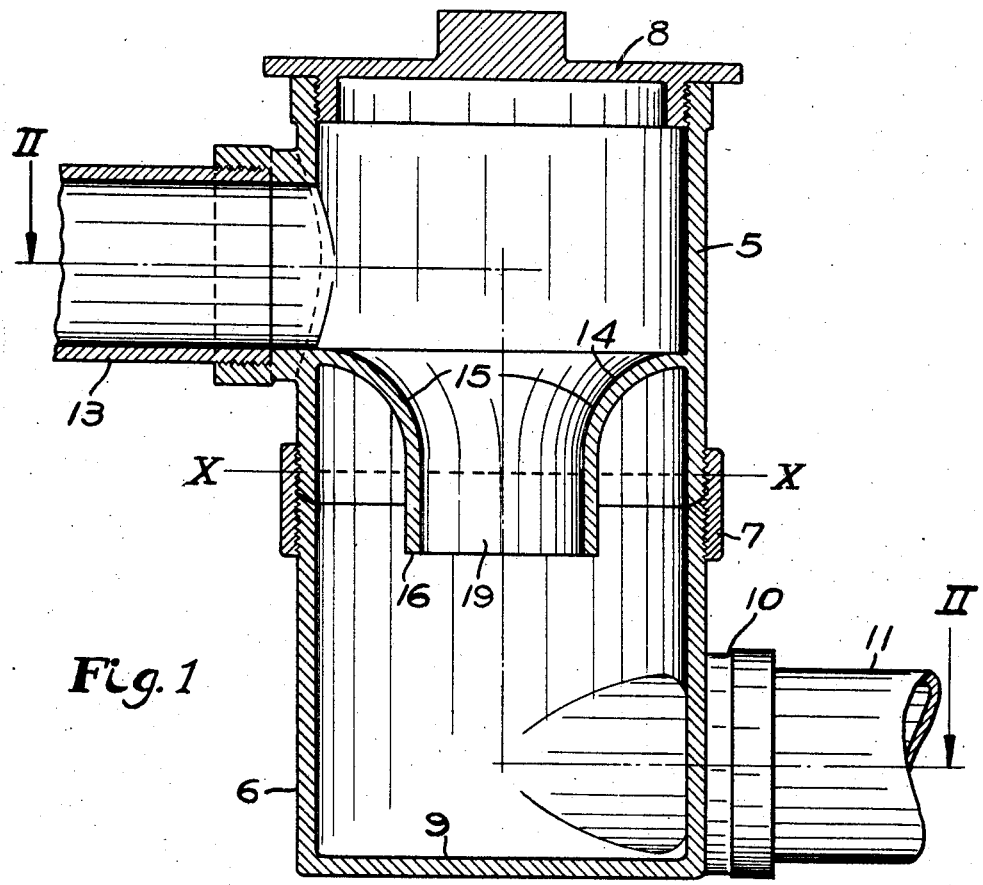
Fig. 1 is a vertical sectional view of a preferred embodiment of my improved waste trap, taken on a line through the center of the body of the trap and that of the outlet opening, and showing the inlet opening as being placed at the side of the body opposite that at which the outlet opening is located.
Figure 2:
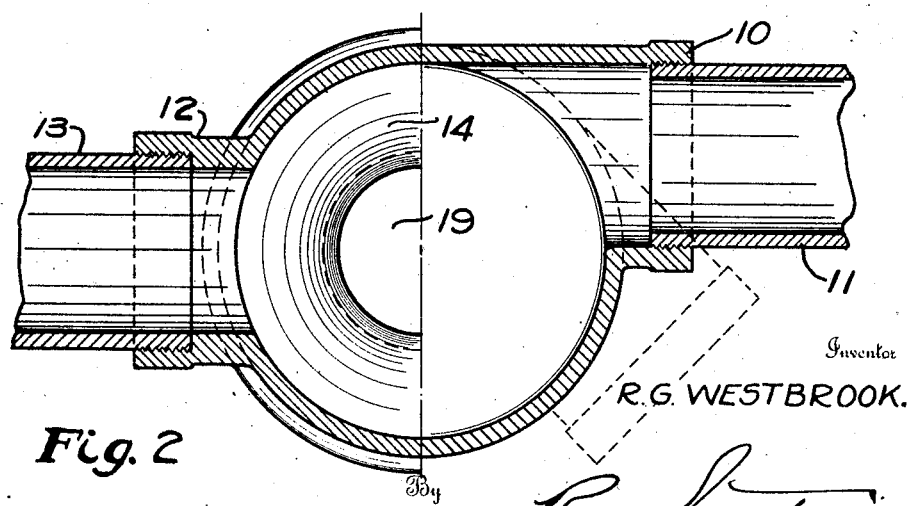
Fig. 2 is a sectional plan, the section being taken substantially on line 2—2 of Fig. 1, and the dotted lines indicating that the upper and lower portions of the trap body may be turned axially relative to each other, to vary the relative positions of the inlet and outlet openings.

Referring now to the drawings in detail, and first to Figs. 1 and 2 thereof, the body of the trap, which ordinarily will be formed of cast iron, comprises two hollow cylindrical parts 5 and 6, of the same interior diameter and thickness of shell, secured together in axial alinement by means of a right-and-left screw-threaded coupling-ring 7, adapted to co-act with suitable screw threads formed exteriorly at the opposed ends of the parts 5 and 6. Preferably, said ends are bevelled and ground, so that when drawn tightly together by means of the coupling-ring 7, a water-tight and gas-tight joint is formed, without the necessity of using any form of gasket or the like. At its upper end, the part 5 is interiorly pipe-threaded, for the water-tight and gas-tight placing of a cover 8.

The lower part 6 of the trap body preferably is cast in one piece, with a closed bottom 9, and has at its extreme lower end an offset annular shoulder 10, the axis of which lies in a plane substantially at right angles to the axis of the trap body, and is tangent to a circle concentric with the inner surface of part 6, and having a radius approximately one-half that of said part; the diameter of the circular opening in shoulder 10 being such that a projection of any portion of its inner surface will pass between the axis of the trap body and the side of said opening which is farthest from said axis. The shoulder 10 is screw-threaded, for the reception of the threaded end of an inlet pipe 11, or of such pipe or fitting as it may be desired to employ between the inlet pipe and the opening in shoulder 10.

The upper part 5 of the trap body preferably is cast in one piece, and is provided, intermediate its end, with an annular shoulder 12, the axis of which preferably lies in a plane at right angles to the axis of the trap body and is radial with respect thereto. Said shoulder is interiorly screw-threaded, for the reception of the threaded end of an outlet pipe 13, or of such pipe or fitting as may be employed as a connection with the outlet pipe. Preferably cast integral with the upper part 5 of the trap body, and extending concentrically downward therein from a plane at right angles to the axis of said part at the level of the extreme lower side of the opening in the shoulder 12, is an inverted sealing member 14, of annular cross-section horizontally, having its shell curved away from the inner face of part 5, as indicated at 15 in Fig. 1, and terminating in an open-ended, substantially cylindrical portion 16, considerably above the level of the extreme upper side of the inlet opening in shoulder 10.

The modified form of my improved trap, shown in Figs. 3 and 4, differs from that just described with reference to Figs. 1 and 2, in having the entire body 17 cast in one piece, and the sealing member 18 given the form of a frustrum of a hollow cone.

In the use of my improved waste trap, the swirling movement of the flush water, produced by its delivery into the trap directly against the curved inner surface of the trap body, but in a line eccentric to the axis thereof, not only results in a scouring action upon all parts of the trap body, particularly the portion thereof below the level of the extreme upper side of the outlet opening, and upon all parts of the sealing member, thereby minimizing or entirely preventing the accumulation to grease, oil, and other waste matter, thereon, but also tends to draw towards the axis of the trap body any fluid matter other than water, and any solid matter, and thus to promote the passage of such matter with the flush water through the opening 19 in the sealing member, and thence out through the outlet opening. This latter is an extremely important provision, especially whenever solid or semi-solid matter that is considerably heavier than water might be present in the waste. Also, due to said swirling movement of the flush water, when the trap is flushed the water is first forced into the space between the sealing member and the adjacent face of the trap, and hence I provide an annular storage space of a substantial capacity from which the stored water, upon cessation of the flushing action will fall back and act to maintain the water in the lower portion of the trap at a higher level than would otherwise be the case, and hence the effectiveness of the water seal is materially enhanced.

By the employment of a two-part construction for the trap body, in the manner illustrated in Figs. 1 and 2, with the inlet opening in one of the body parts, and the outlet opening in the other one thereof, and the two parts so connected as to permit one of them to be turned radially relative to the other, the positions of the inlet and outlet openings may be made to conform to those of the inlet and outlet pipes, respectively, without the necessity of having undesirable bends in the inlet and outlet connections.

The presence of a ground joint at the junction of the two parts of the trap body, avoids the use of a gasket or the like at that point, where it would be subjected to the destructive action of grease, oil, gases and other agents such as cause rapid deterioration of the materials ordinarily employed for gaskets. By making the sealing member unitary, with the trap body, a water-tight and gas-tight connection between the two insured, without the use of a gasket or packing, and the desired results are secured at a minimum of expense.

Various modifications of minor details of construction and arrangements of parts, as shown and described herein, doubtless readily will suggest themselves to those skilled in this art, but such modifications fall within the intended scope of my invention, which is not to be construed as being limited to any details not set forth in the appended claims.

Having thus described my invention, what I claim as new and seek to secure by Letters Patent, is—

1. In a waste trap, a cylindrical body having a lower inlet and an upper outlet, both said inlet and said outlet being in the side wall of the body, and means interposed between the inlet and outlet forming an inverted annular chamber of such dimensions as to hold sufficient liquid to seal the inlet, said inlet having such form and arrangement that the inflowing fluid is given a swirling movement within the trap.

2. In a waste trap, a cylindrical body means providing a lower chamber having inlet means in the lower side wall portion thereof, means providing an upper chamber with outlet means in the upper side wall portion thereof, and means providing an inverted annular chamber between the inlet and outlet chambers, said annular chamber being of such capacity as to hold sufficient liquid to seal the lower inlet means, said inlet having such form and arrangement that the inflowing fluid is given a swirling movement within the trap.

3. In a waste trap, a cylindrical body, a lower inlet in the side wall thereof, and an upper outlet in the side wall thereof, and means providing an inverted annular chamber between the inlet and outlet, and having a central opening concentric with the body, said inverted chamber being of such capacity as to hold sufficient liquid to seal the lower inlet means, said inlet having such form and arrangement that the inflowing fluid is given a swirling movement within the trap.

4. In a waste trap, means providing a lower chamber having inlet means in the lower portion thereof, means providing an upper chamber coaxially arranged with respect to the lower chamber and having outlet means in the upper portion thereof, an inverted frusto-conical wall member interposed between the upper and lower chambers and provided with a central opening, said member forming with the wall of the lower chamber an inverted annular chamber of such capacity as to hold sufficient liquid to seal the lower inlet means, said inlet having such form and arrangement that the inflowing fluid is given a swirling movement within the trap.

5. In a waste trap, a cylindrical body having an inlet in the lower side wall thereof, and having outlet means in the upper side wall thereof, an inverted frusto-conical wall member interposed between the inlet and outlet and provided with a central opening, said member forming with the wall of the body an inverted annular chamber of such capacity as to hold sufficient liquid to seal the inlet, said inlet having such form and arrangement that the inflowing fluid is given a swirling movement within the trap, and means for relative angular displacement of the inlet and outlet.

6. In a waste trap, a cylindrical upper chamber, a cylindrical lower chamber, a horizontal joint between the chambers providing relative angular displacement therebetween, inlet and outlet means provided in the lower and upper chambers respectively, and means providing an inverted annular chamber between the upper and lower chambers and opening centrally to provide communication between the chambers, said annular chamber being of such capacity as to hold sufficient liquid to seal the inlet means of the lower chamber, said inlet having such form and arrangement that the inflowing fluid is given a swirling movement within the trap.

7. In a waste trap, means providing a lower chamber having inlet means in the lower portion thereof, means providing an upper chamber coaxially arranged with respect to the lower chamber and having outlet means in the upper portion thereof, an inverted frusto-conical wall member interposed between the upper and lower chambers and provided with a central opening, said member forming with the wall of the lower chamber an inverted annular chamber of such capacity as to hold sufficient liquid to seal the lower inlet means, there being an unobstructed passage through said central opening to allow a high velocity of water therethrough.

In testimony whereof I affix my signature.

ROBERT G. WESTBROOK.